United States Patent
Gumaer

(10) Patent No.: US 9,190,901 B2
(45) Date of Patent: Nov. 17, 2015

(54) BRIDGELESS BOOST POWER FACTOR CORRECTION CIRCUIT FOR CONSTANT CURRENT INPUT

(71) Applicant: Traver Gumaer, Easthampton, MA (US)

(72) Inventor: Traver Gumaer, Easthampton, MA (US)

(73) Assignee: Cooper Technologies Company, Houston, TX (US)

( * ) Notice: Subject to any disclaimer, the term of this patent is extended or adjusted under 35 U.S.C. 154(b) by 330 days.

(21) Appl. No.: 13/887,205

(22) Filed: May 3, 2013

(65) Prior Publication Data
US 2014/0328097 A1 Nov. 6, 2014

(51) Int. Cl.
*G05F 1/10* (2006.01)
*H02M 1/42* (2007.01)

(52) U.S. Cl.
CPC ............ *H02M 1/4225* (2013.01); *Y02B 70/126* (2013.01)

(58) Field of Classification Search
CPC ............. G05F 1/44; G05F 1/613; G05F 5/00; H02M 1/4425
USPC ......... 323/222, 225, 268, 271, 272, 282, 285; 363/84, 89
See application file for complete search history.

(56) References Cited

U.S. PATENT DOCUMENTS

| 4,386,395 A | 5/1983 | Francis, Jr. |
| 4,683,529 A | 7/1987 | Bucher, II |
| 5,367,247 A | 11/1994 | Blocher et al. |
| 5,568,041 A | 10/1996 | Hesterman |
| 5,598,326 A | 1/1997 | Liu et al. |
| 5,614,812 A | 3/1997 | Wagoner |
| 5,631,550 A | 5/1997 | Castro et al. |
| 5,650,925 A | 7/1997 | Hesterman |
| 5,682,306 A | 10/1997 | Jansen |
| 5,804,950 A | 9/1998 | Hwang et al. |
| 5,838,181 A | 11/1998 | Hesterman |
| 5,844,399 A | 12/1998 | Stuart |
| 6,043,633 A | 3/2000 | Lev et al. |
| 6,177,782 B1 | 1/2001 | L'Hermite et al. |

(Continued)

FOREIGN PATENT DOCUMENTS

| JP | 2001037252 | 2/2001 |
| JP | 2010115088 | 5/2010 |

(Continued)

OTHER PUBLICATIONS

Lopatkina, R., International Search Report and Written Opinion of the International Searching Authority for PCT/US2014/036248, Sep. 4, 2014, pp. 1-7.

(Continued)

*Primary Examiner* — Matthew Nguyen
(74) *Attorney, Agent, or Firm* — King & Spalding LLP

(57) ABSTRACT

The present disclosure provides techniques for power factor correction on a constant current system without the use of a diode rectifier bridge. In an example embodiment, the present disclosure provides a power factor correction circuit which includes two switching MOSFETs biased in opposite directions which operate during opposite half cycles of the input current. The power factor correction circuit generates an input voltage to match the phase of the input current. The input voltage is generated via charging and draining of an input capacitor by the MOSFETs. The MOSFETs are driven on a duty cycle synchronously associated with the input current wave form.

20 Claims, 4 Drawing Sheets

(56) References Cited

U.S. PATENT DOCUMENTS

| | | |
|---|---|---|
| 6,259,613 B1 | 7/2001 | Lee et al. |
| 6,657,417 B1 | 12/2003 | Hwang |
| 6,906,503 B2 | 6/2005 | Lopez-Santillana et al. |
| 6,909,622 B2 | 6/2005 | Weng |
| 7,088,079 B2 | 8/2006 | Lefedjiev |
| 7,180,273 B2 | 2/2007 | Bocchiola et al. |
| 7,205,749 B2 | 4/2007 | Hagen et al. |
| 7,269,038 B2 | 9/2007 | Shekhawat et al. |
| 7,279,876 B2 | 10/2007 | Adragna et al. |
| 7,323,851 B2 | 1/2008 | Markowski |
| 7,394,236 B2 | 7/2008 | Chapuis et al. |
| 7,456,621 B2 | 11/2008 | Leung et al. |
| 7,489,116 B2 | 2/2009 | Lanni |
| 7,554,310 B2 | 6/2009 | Chapuis et al. |
| 7,723,964 B2 | 5/2010 | Taguchi |
| 7,746,040 B2 | 6/2010 | Garrity et al. |
| 7,777,459 B2 * | 8/2010 | Williams ............. 323/266 |
| 7,821,237 B2 | 10/2010 | Melanson |
| 7,889,517 B2 | 2/2011 | Artusi et al. |
| 7,919,958 B2 | 4/2011 | Oettinger et al. |
| 8,014,176 B2 | 9/2011 | Melanson et al. |
| 8,076,920 B1 | 12/2011 | Melanson |
| 8,094,472 B2 | 1/2012 | Chang et al. |
| 8,125,197 B2 | 2/2012 | Hwang et al. |
| 8,129,958 B2 | 3/2012 | Ku et al. |
| 8,130,522 B2 | 3/2012 | Maksimovic |
| 8,207,713 B2 | 6/2012 | Sugawara |
| 8,228,046 B2 | 7/2012 | Ingemi et al. |
| 8,248,145 B2 | 8/2012 | Melanson |
| 8,270,190 B2 | 9/2012 | Adragna |
| 8,279,630 B2 | 10/2012 | Choi |
| 8,558,518 B2 | 10/2013 | Irissou et al. |
| 8,587,970 B2 | 11/2013 | Uno et al. |
| 8,830,702 B2 | 9/2014 | Macfarlane |
| 8,890,497 B2 * | 11/2014 | Peschke ............. 323/271 |
| 2006/0255772 A1 | 11/2006 | Chen |
| 2007/0036212 A1 | 2/2007 | Leung et al. |
| 2008/0252268 A1 | 10/2008 | Feldtkeller et al. |
| 2011/0109283 A1 | 5/2011 | Kapels et al. |
| 2011/0193494 A1 | 8/2011 | Gaknoki et al. |
| 2011/0205763 A1 | 8/2011 | Artusi et al. |
| 2011/0280053 A1 | 11/2011 | Halberstadt |
| 2012/0014150 A1 | 1/2012 | Domb |
| 2012/0069615 A1 | 3/2012 | Tomioka |
| 2012/0106216 A1 | 5/2012 | Tzinker et al. |
| 2012/0120696 A1 | 5/2012 | Nishijima |
| 2012/0126759 A1 | 5/2012 | Lee et al. |
| 2012/0146529 A1 | 6/2012 | Campbell et al. |
| 2012/0169313 A1 | 7/2012 | Lee et al. |
| 2012/0187863 A1 | 7/2012 | Nonaka et al. |
| 2013/0088904 A1 | 4/2013 | Yamanaka et al. |
| 2013/0187623 A1 * | 7/2013 | Harel ............. 323/271 |
| 2013/0320882 A1 | 12/2013 | Gaknoki et al. |
| 2013/0322139 A1 | 12/2013 | Lee et al. |
| 2014/0003105 A1 | 1/2014 | Lin et al. |
| 2014/0078798 A1 | 3/2014 | Turchi |
| 2014/0097808 A1 | 4/2014 | Clark et al. |
| 2014/0320096 A1 * | 10/2014 | Pansier ............. 323/271 |
| 2014/0327411 A1 | 11/2014 | Gumaer |
| 2014/0328096 A1 | 11/2014 | Gumaer |
| 2014/0328097 A1 | 11/2014 | Gumaer |
| 2014/0328415 A1 | 11/2014 | Gumaer |

FOREIGN PATENT DOCUMENTS

| | | |
|---|---|---|
| KR | 2009005011 | 5/2009 |
| SU | 288182 | 12/1970 |
| WO | 2005041393 | 5/2005 |

OTHER PUBLICATIONS

Lopatkina, R., International Search Report and Written Opinion of the International Searching Authority for PCT/US2014/036256, Sep. 17, 2014, pp. 1-7.

Golovinova, I., International Search Report and Written Opinion of the International Searching Authority for PCT/US2014/036252, Sep. 17, 2014, pp. 1-7.

Fairchild Semiconductor Corporation, Application Note 42047 Power Factor Correction (PFC) Basics, Aug. 19, 2004, 11 pages, Fairchild Semiconductor Corporation.

Golovinova, I., International Search Report and Written Opinion of the International Searching Authority for PCT/US2014/036254, Oct. 3, 2014, pp. 1-7.

* cited by examiner

BRIDGELESS BOOST POWER FACTOR CORRECTION CIRCUIT FOR CONSTANT CURRENT INPUT

TECHNICAL FIELD

The present disclosure relates generally to power factor correction. Specifically, the present disclosure relates to techniques for providing power factor correction on a system having a constant current input.

BACKGROUND

Power factor correction is often used in electric power systems and between power sources and loads in order to synchronize the input current and the input voltage before it is delivered to the load. Power factor correction can provide many benefits to the electric power system and the load, such as prolonged life and energy efficiency.

Traditionally, power factor correction circuitry is designed as voltage based power factor correction. Such circuitry is used in constant voltage systems, and the input current waveform is made to match the input voltage waveform. However, in certain industries, such as airfield lighting, the existing infrastructure requires current based systems which require a constant current power source rather than a constant voltage power source. Specifically, in the area of airfield lighting, constant current systems are traditionally used because of the need for consistent brightness across the plurality of light fixtures coupled in series and being powered by the same power source. Because a constant current power supply can provide the same level of current to each of the light fixtures, it became the standard form of power distribution in the area of airfield lighting. Though lighting technology has become more sophisticated in recent years, the infrastructure has remained is current based system. However, power factor correction techniques used for voltage based systems which receive a constant voltage generally cannot be used for current based systems.

SUMMARY

In an example embodiment of the present disclosure, to bridgeless constant current power factor correction circuit includes an input capacitor configured to receive an input current front a constant current source and produce an input voltage. The bridgeless constant current power factor correction circuit further includes a first switching device coupled to the input capacitor and the current source, wherein the first switching device is operable during a first half cycle of the input current and shorted during a second half cycle of the input current, and wherein when operable, the first switching device switches between an ON state and an OFF state. The bridgeless constant current power factor correction circuit includes a second switching device coupled to the input capacitor and the current source, wherein the second switching device is operable during the second half cycle of the input current and shorted during the first half cycle of the input current, and wherein when operable, the second switching device switches between the ON state and the OFF state. The bridgeless constant current power factor correction circuit also includes is controller coupled to the first switching device and the second switching device, wherein the controller switches the first or second device between the ON state and the OFF state, depending on the half cycle of the input current. When one of the first or second switching devices is in the OFF state, the input capacitor charges and the input voltage rises, and when one of the first or second switching devices is in the ON state, the input capacitor drains and the input voltage drops. The bridgeless constant current power factor correction circuit also includes a DC output bus providing an output voltage, wherein the output voltage is a conditioned form of the input voltage, wherein the input voltage is in phase with the input current.

In another example embodiment of the present disclosure, a bridgeless constant current power factor correction circuit includes an input capacitor configured to receive an input current from a constant current source and produce an input voltage, wherein the input current comprises a current waveform. The bridgeless constant current power factor correction circuit also includes a first MOSFET switchable between an ON state and an OFF state when the input current is in a first half cycle, and a second MOSFET switchable between the ON state and the OFF state when the input current is in a second half cycle, wherein when one of the first or second MOSFETs is in the OFF state, the input capacitor is charged from the input current and the input voltage rises, and when one of the first or second MOSFETs is in the ON state, the input capacitor is drained and the input voltage drops. Switching back and forth between the OFF state and the ON state gives the input voltage a substantially sinusoidal waveform, wherein the sinusoidal waveform is in phase with the input current waveform. The bridgeless constant current power factor correction circuit further includes a controller coupled to the switching device, wherein the controller controls switching of the first and second MOSFETs.

In another example embodiment of the present disclosure, a method of power factor correction on a constant current system includes receiving an input current from a constant current input source, the input current having a current waveform, allowing an input capacitor to charge from the input current, wherein an input voltage formed at the input capacitor rises as the input capacitor charges, determining if the input voltage reaches a reference voltage. When the input current is in a first half cycle, the method includes switching a first switching device from a first state to as second state when the input voltage reaches the reference voltage. When the input current is in a second half cycle, the method includes switching a second switching device from a first state to a second state when the input voltage reaches the reference voltage. The method further includes allowing the input capacitor to drain, wherein the input voltage drops as the input capacitor drains, and shaping the input voltage to have a voltage waveform similar to the current waveform by controlling the switching of the first and second switching devices.

BRIEF DESCRIPTION OF THE DRAWINGS

For a more complete understanding of the disclosure and the advantages thereof, reference is now made to the following description, in conjunction with the accompanying figures briefly described as follows.

Figure 1:
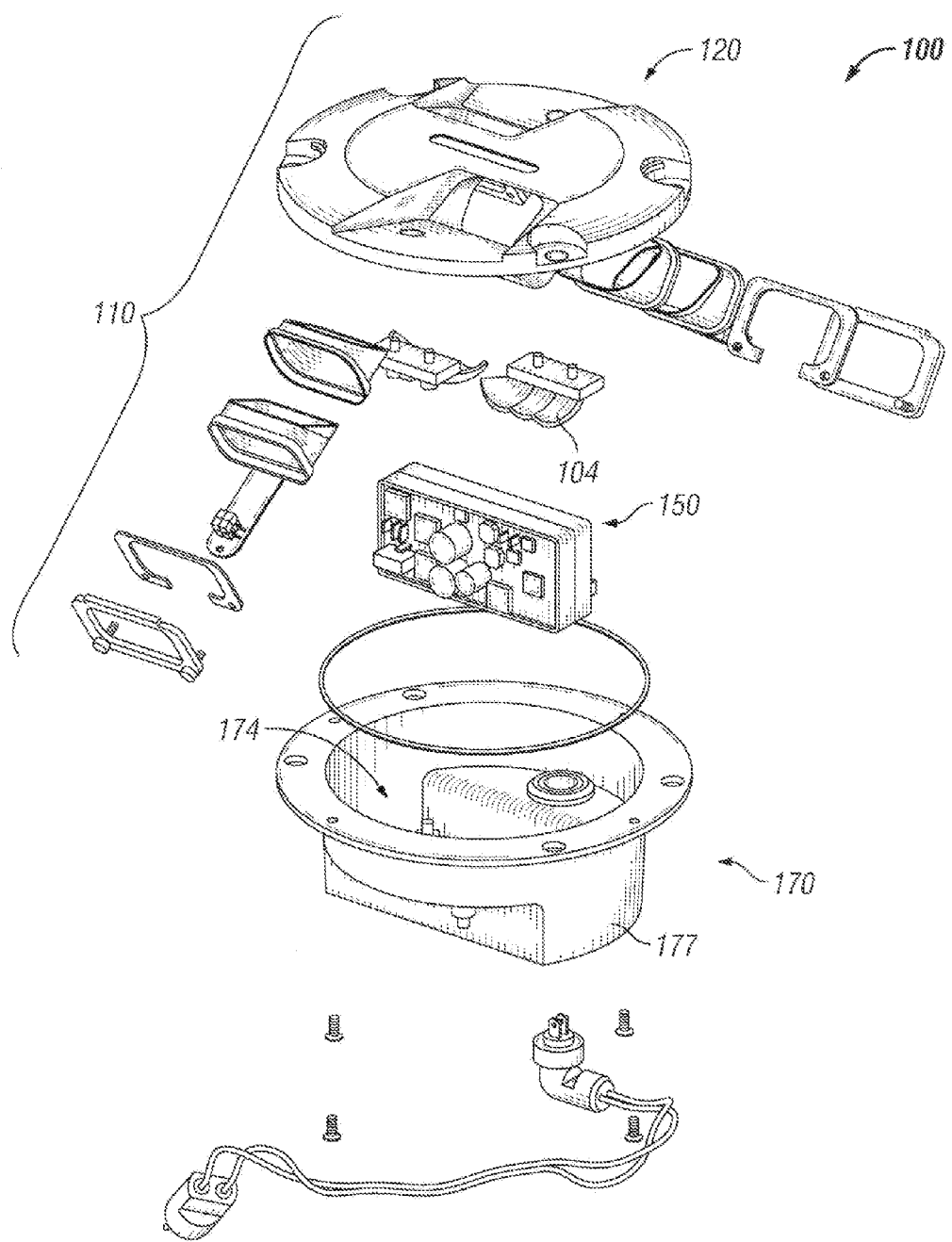
FIG. 1 illustrates a light fixture powered by a constant current system and having a bridgeless power factor correction circuit, in accordance with an example embodiment of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The present disclosure provides systems and methods of power factor correction operating on a constant current input source. The present disclosure is directed towards power distribution systems in the area of airfield lighting as an example application, but may be used with any other appropriate power distribution system operating on a constant current input source.

In certain example embodiments, the present disclosure provides a power factor correction circuit for use in systems with constant current input sources. In one example, the power factor correction circuit is used in an airfield lighting system which includes a plurality of individual light fixtures. Each of the light fixtures receives a constant current power supply from a central power source. In certain example embodiments, each or a subset of the light fixtures includes the power factor correction circuit disclosed herein, which improves the energy efficiency of the light fixtures.

FIG. 1 shows an exploded perspective view of one such light fixture 100 in accordance with certain example embodiments. Referring now to FIG. 1, the light fixture 100 is an example of an airport runway and/or taxiway light fixture. The light fixture 100 of FIG. 1 includes a frame, a light source 104, and a power supply 150. The frame can include a cover 170 and optical housing 120. The light fixture 100 further includes an optical housing assembly 110. The optical housing assembly 110 includes the combination of one or more components associated with the mechanical structure and configuration of the optical housing 120 and other optical components, such as a body, lens, diffuser, connectors, and the like.

In certain example embodiments, the cover 170 includes at least one wall 177 that forms a cavity 174. Inside of the cavity 174 can be positioned at least one or more light sources 104 and the power supply 150. The cover 170 can include one or more features (e.g., ledges, apertures) that allow the various components disposed in the cavity 174 to fit and maintain electrical, mechanical, and/or thermal coupling with each other. The optical housing 120 protects the components disposed within the cavity 174, and can secure the light sources 104 and the other internal components 130.

The power supply 150 includes one or more circuits and electrical components configured to receive the constant current input from the central power source, condition the received current, and drive the light sources 104. In certain example embodiments, the power supply includes the power factor correction circuit disclosed herein, such that the constant current input is conditioned for power factor correction before it is supplied to the light sources 104, thereby improving energy efficiency.

Figure 2:
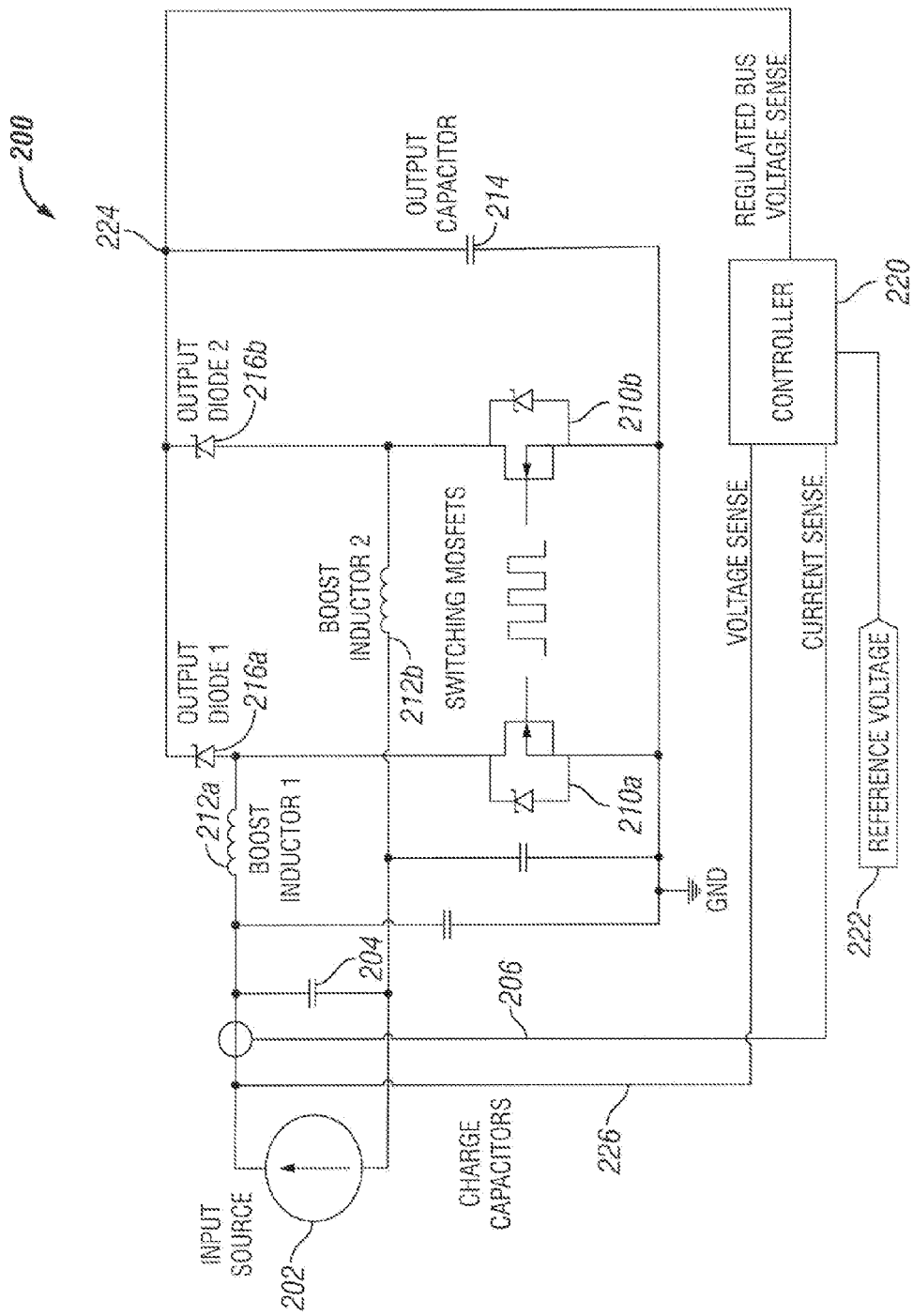
FIG. 2 illustrates a schematic diagram of a bridgeless power factor correction circuit having a constant current input, in accordance with an example embodiment of the present disclosure.

FIG. 2 illustrates a schematic diagram of a bridgeless power factor correction (PFC) circuit 200, in accordance with an example embodiment of the present disclosure. In certain example embodiments, the bridgeless PFC circuit 200 includes an input, source 202, an input charging capacitor 204, a first inductor 212a, a first switching MOSFET 210a, and a first output diode 216a. The bridgeless PFC circuit 200 further includes a second inductor 212b, a second switching MOSFET 210b, a second output diode 216b, a controller 220, an output capacitor 214, and a DC output bus 224. The input source 202 provides a constant current power supply to the circuit 200. In certain example embodiments, the input source 202 provides a 6.6 amp, 60 hertz, sine wave.

The bridgeless PFC circuit 200 receives power from the constant current input source 202 and outputs DC power via the DC output bus 224 to a load. The bridgeless PFC circuit 200 shapes the waveform of the output voltage supplied at the DC output bus 224 to follow and be synchronized with the waveform of the input current. In certain example embodiments, the waveform of the voltage is at least partially shaped by controlling the charging and draining of the input charging capacitor by the first and second MOSFETs 210a, 210b. The input source 202 provides a constant alternating current, which is positive during one half cycle and negative during the other half cycle. Rather than rectifying the input current by using a diode rectifier bridge, the bridgeless PFC circuit 200 utilizes two MOSFETs 210a, 210b, coupled to the circuit 200 in opposite directions. Typically, a diode rectifier bridge includes a plurality (e.g., 4) of diodes, which results in a relatively large power loss. Thus, the ability to handle an alternating current without the use of a rectifier bridge significantly increases energy efficiency.

For example, the first MOSFET 210a is in operation to control charging and draining of the input charging capacitor 204 when the input current is on the first half cycle (e.g., positive). During this time, the second MOSFET 210b, which is biased in the wrong direction when the current is in the first half cycle, acts as a short. Likewise, when the input current is in the second half cycle (e.g., negative), the second MOSFET 210b, which is now biased in the operational direction, can be switched to control the charging and draining of the input charging capacitor 102. During this time, the first MOSFET 210a, which is now biased in the wrong direction, acts as a short. In certain example embodiments, the first MOSFET 210a works in conjunction with the first inductor 212a and the first output diode 216a to produce a voltage having a waveform which matches the input current waveform. Likewise, the second MOSFET works in conjunction with the second inductor 212b and the second output diode 216b.

The following describes, in further detail, the operation of the bridgeless PFC circuit and how it is controlled to produce a voltage waveform which is matched to the input current. The first and second MOSFETs 210a, 210b may sometimes be referred to generically as "the MOSFET 210". The MOSFET 210 refers to either the first or second MOSFET 210a, 210b, depending on which half cycle the input current is in, as the first and second MOSFETs 210a, 210b are identical in their operation relative to their given half cycle. Thus, the general operation of both the first MOSFET 210a and the second MOSFET 210b is described in terms of the MOSFET 210 for sake of brevity. Likewise, the first and second inductors 212a, 212b, which are respectively associated with the first and second MOSFETs 210a, 210b, may be referred to as "the inductor 212." Additionally, the first and second output diodes 216a, 216b, which are respectively associated with the first and second MOSFETs 210a, 210b, may be referred to as "the output diode 216." The first MOSFET 210a and the second MOSFET 210b will be separately identified when a distinction is to be made.

Still referring to FIG. 2, in certain example embodiments, the input source 202 is directly coupled to the input charging capacitor 204. The input current from the constant current input source 202 charges the input charging capacitor 204 when the MOSFET 210 is in an off state. In certain example embodiments, the MOSFET 210 is initially off. Thus, in this state, the input current from the constant current input source 202 charges the input charging capacitor 204. As the input current charges the input charging capacitor 204, a voltage rise occurs in the input charging capacitor 204. When the voltage rises to a certain threshold level, the MOSFET 210 is switched on. In certain example embodiments, the threshold level is determined by a reference voltage 222 such that the voltage at the input charging capacitor 204 is allowed to rise until it reaches the level of the reference voltage 222. In certain example embodiments, the controller 220 provides the reference voltage 222 and also receives a sensed voltage signal 226 of the voltage at the input charging capacitor 204. The controller 220 also receives a sensed current signal 206 from the input current. In certain example embodiments, the reference voltage 222 is indicative of the level of desired output power, or the amplitude of the voltage waveform. The controller 220 compares a sensed voltage signal 226 to the reference voltage 222 and controls the MOSFET 210 accordingly. The controller 220 will be described in further detail below with respect to FIG. 3. The controller 220 sends a switching signal to both the first MOSFET 210a and the second MOSFET 210b. However, only one of the first and second MOSFETs 210a, 210b will be able to operate accordingly at one time.

When the voltage at the input charging capacitor 204 reaches the reference voltage 222, the MOSFET 210 is switched on. When the MOSFET 210 is switched on, current is drained frown the input charging capacitor 204 and the voltage drops accordingly. Thus, voltage at the input charging capacitor 204 rises when the MOSFET 210 is off and drops when the MOSFET 210 is on, creating a waveform which follows the duty cycle of the MOSFET 210. During the time the MOSFET 210 is on, current rises in the inductor 222. Thus, when the MOSFET 210 is switched off again, the inductor flies back and delivers energy, which is rectified by the output diode 216, to the output capacitor 214. The voltage at the output capacitor 214 is provided to a DC output bus 224 and configured to be delivered to a load. As the MOSFET 210 switches at a high frequency (hundreds of kHz) according to a controlled duty cycle, the instantaneous voltage at the input charge capacitor 204 will match the reference voltage of each cycle. Thus, a sine wave input voltage in which the waveform is matched to the waveform of the input current is created over time. Specifically, for example, during the first half cycle, the first MOSFET 210a is switchable, by the controller 220, between the on state and the off state. During the second half cycle, the second MOSFET 210b is switchable, by the controller 220, between the on state and the off state.

In another example embodiment, the controller 220 does not necessarily monitor the input voltage 226. Rather, the switching device is provided with a pulse width modulation signal shaped like a sine wave regardless of the input voltage, which forces the input voltage to take on a waveform as defined by the pulse width modulation signal.

In another embodiment of the present disclosure, the bridgeless PFC circuit 200 includes a flyback configuration. In such an embodiment, the first and second inductors 212a, 212b are replaced with first and second transformers (not shown), respectively. The secondary windings of the first and second transformers provide the output voltage. However, because the transformers provide a variable transformer ratio, the level of output voltage can be controlled by adjusting the transformer ratio.

Figure 3:
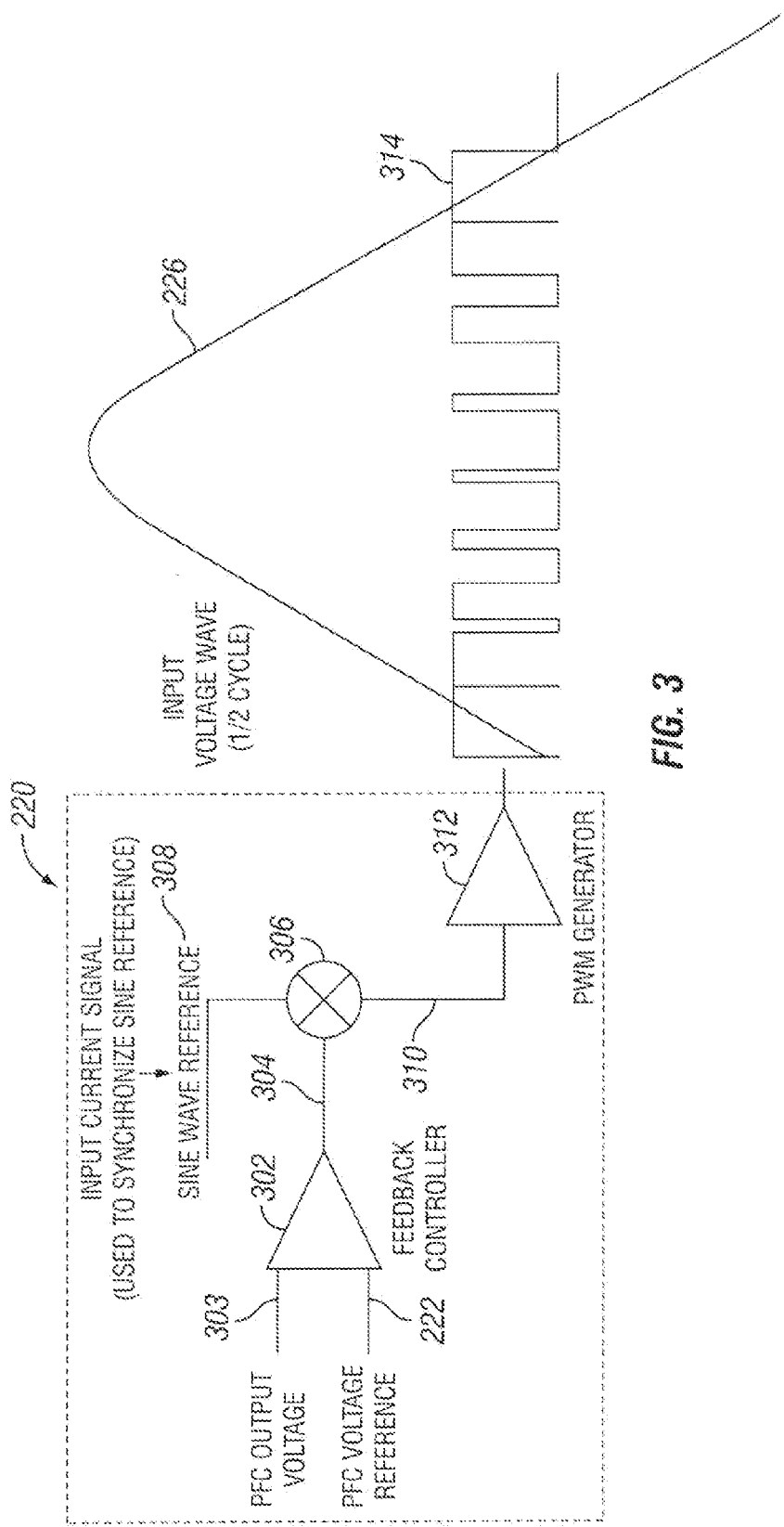
FIG. 3 illustrates a diagram of a controller of the bridgeless power factor correction circuit of FIG. 1, in accordance with an example embodiment of the present disclosure.

FIG. 3 illustrates a diagrammatical representation of the controller 220 of FIG. 2, in accordance with an example embodiment. The controller 220 includes a feedback controller 302 which receives, as inputs, a sense output voltage 303 from the DC output bus 224 and the reference voltage 222. The value of the reference voltage 222 is typically selected according to the desired amount of power to be provided at the DC output bus 224. The value of the sensed output voltage 303 is compared with the value of reference voltage 222. If the value of the sensed output voltage 303 is below the value of the reference voltage 222, the output 304 of the feedback controller 302 will increase. If the value of the sensed output voltage 303 is above the value of the reference voltage 222, the output 304 of the feedback controller 302 will decrease. The output 304 of the feedback controller 302 is then multiplied 306 by a sine wave reference 308. In certain example embodiments, the input current signal 206 is applied to the sine wave reference 308 to synchronize the sine wave reference 308 with the input current signal 206. Thus, the output 310 of the multiplication 306 of the sine wave reference 308 and the feedback controller output 304 is a sine wave 310 which varies in amplitude with the feedback controller output 304.

In certain example embodiments, the controller 220 further includes as pulse width modulation (PWM) generator 312. The PWM generator 312 receives as input, the sine wave 310 and converts the sine wave 310 into a pulse width modulation signal 314. The pulse width modulation signal 314 is used to drive the MOSFET 210 (FIG. 2). In certain example embodiments, the duty cycle of the pulse width modulation signal 314 decreases to increase the input voltage 226, and the pulse modulation signal 314 increases to decrease the input voltage 226. At the peaks of the sine wave 310, the pulse width modulation signal 314 is at its controlled minimum, and the input voltage is at its peak. Thus, the peaks of the input voltage waveform are matched to the peaks of the sine wave 310, which has been synchronized with the input current 206. Therefore, the input voltage waveform is matched to that of the input current 206.

Figure 4:
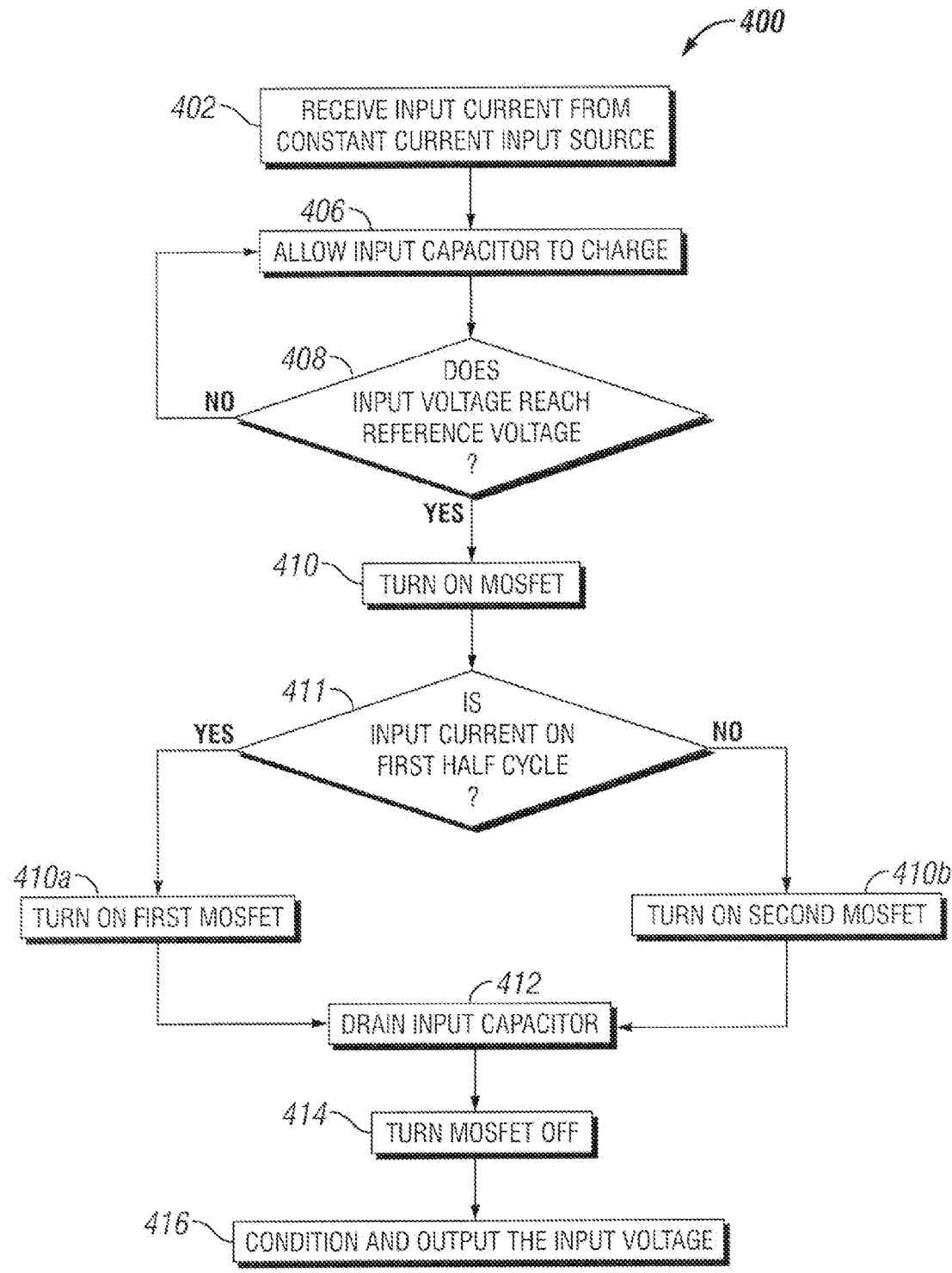
FIG. 4 illustrates a flow chart of a method of current-based bridgeless power factor correction, in accordance with an example embodiment of the present disclosure.

FIG. 4 illustrates a method of bridgeless power factor correction 400 for a constant current system, in accordance with an example embodiment. Specifically, in certain example embodiments, the method of power factor correction 400 is implemented via the power factor correction circuit of FIG. 2. Referring to FIGS. 2 and 4, the method of power factor correction 400 includes receiving an input current from a constant current input source 202 (step 402). The method 400 further includes allowing the input capacitor 204 to be charged (step 406). Specifically, in certain example embodiments, the MOSFET 210 is initially in the off state. As previously discussed, when the MOSFET 210 is in the off state, the input capacitor charges, and the input voltage increases. In certain example embodiments, the input voltage is constantly being monitored by the controller 220 via the input voltage sense 226. The method further includes determining whether the input voltage has reached the reference voltage (block 408). In certain example embodiments, the reference voltage includes an amplitude indicative of the desired level of power output as well as a phase which is synchronized with the input current.

In order to make the determination, the controller 220 compares the value of the input voltage to the value of the reference voltage. If it is determined that the input voltage is less than the reference voltage, the method goes to step 406, in which the MOSFET 210 remains off and the input capacitor is allowed to charge. As discussed, the MOSFET 210 (first MOSFET 210a or second MOSFET 210b) that is operational depends on the half (positive or negative) of the input current cycle. In certain example embodiments, steps 406 and 408 are repeated until it is determined at step 408 that the input voltage has reached the reference voltage. In certain example embodiment, the controller 220 constantly monitors the input voltage and reacts when the sensed voltage value reaches a threshold representative of the reference voltage. When it is determined that the input has reached the reference voltage, the MOSFET 210 switches on (step 410). Specifically, in certain embodiments, it is determined whether the input current is on the first half cycle (block 411). If the input is on the first half cycle, then the first MOSFET 210a is correctly biased and operational. Therefore, the first MOSFET 210a turns on (block 410a). IF the input current is not on the first half cycle, then it must be on the second half cycle. In that case, the second MOSFET 210b turns on (block 410b). When the MOSFET 210 (either first MOSFET 210a or second MOSFET 210b) turns on, the input capacitor drains (step 412), and the input voltage drops. The method 400 further includes switching the MOSFET 210 off again (414) to allow the input voltage to rise again, forming a sinusoidal waveform. As explained Above, MOSFET 210 refers to whichever one of the first MOSFET 210a and the second MOSFET 210b that is presently operational. The method 400 also includes continuously conditioning and outputting the input voltage via a DC output bus 224 (step 416). In certain example embodiments, the input voltage is filtered by the inductor 212 and rectified by the output diode 216. With such a method, the voltage output of a constant current power correction circuit is made to match and follow the phase of the constant current input current. Thus, power efficiency is improved.

The present disclosure provides techniques for power factor correction on a constant current system by matching the voltage waveform to the input current waveform. Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following, claims, the scope of which are to be accorded the broadest interpretation so as to encompass modifications and equivalent structures.

What is claimed is:

1. A bridgeless constant current power factor correction circuit, comprising:
    an input capacitor configured to receive an input current from a constant current source and produce an input voltage;
    a first switching device coupled to the input capacitor and the current source, wherein the first switching device is operable during a first half cycle of the input current and shorted during a second half cycle of the input current, and wherein when operable, the first switching device switches between an ON state and an OFF state;
    a second switching device coupled to the input capacitor and the current source, wherein the second switching device is operable during the second half cycle of the input current and shorted during the first half cycle of the input current, and wherein when operable, the second switching device switches between the ON state and the OFF state;
    a controller coupled to the first switching device and the second switching device, wherein the controller switches the first or second switching device between the ON state and the OFF state, depending on which half cycle the input current is in, wherein when one of the first or second switching devices is in the OFF state, the input capacitor charges and the input voltage rises, and when one of the first or second switching devices is in the ON state, the input capacitor drains and the input voltage drops; and
    a DC output bus providing an output voltage, wherein the output voltage is a conditioned form of the input voltage, wherein the input voltage is in phase with the input current.

2. The bridgeless constant current power factor correction circuit of claim 1, wherein the first and second switching devices each comprises a switching MOSFET.

3. The bridgeless constant current power factor correction circuit of claim 1, wherein during the first half cycle, the first switching device is put in the ON state when the input voltage reaches a reference voltage, the reference voltage representing a desired power level of the output voltage.

4. The bridgeless constant current power factor correction circuit of claim 1, wherein the controller comprises a feedback controller, wherein the feedback controller receives and compares the output voltage and the reference voltage, wherein a feedback controller output increases when the output voltage is below the reference voltage and decreases when the output voltage is above the reference voltage.

5. The bridgeless power factor correction circuit of claim 4, wherein the feedback controller output is multiplied with a sine wave reference signal to obtain a synchronized reference signal, wherein the sine wave reference signal has a phase matching the phase of the input current.

6. The bridgeless power factor correction circuit of claim 5, wherein the controller further comprises a pulse width modulation generator, wherein the pulse width modulation generator generates a pulse width modulation signal from the synchronized reference signal, which drives the first and second switching devices.

7. The bridgeless power factor correction circuit of claim 1, further comprising:
    a first transformer, wherein the first transformer provides the output voltage during the first half cycle of the input current; and
    a second transformer, wherein the second transformer provides the output voltage during the second half cycle of the input current.

8. A bridgeless constant current power factor correction circuit, comprising:
    an input capacitor configured to receive an input current from a constant current source and produce an input voltage, wherein the input current comprises a current waveform;
    a first MOSFET switchable between an ON state and an OFF state when the input current is in a first half cycle;

a second MOSFET switchable between the ON state and the OFF state when the input current is in a second half cycle, wherein when one of the first or second MOSFETs is in the OFF state, the input capacitor is charged from the input current and the input voltage rises, and when one of the first or second MOSFETs is in the ON state, the input capacitor is drained and the input voltage drops, wherein switching back and forth between the OFF state and the ON state gives the input voltage a substantially sinusoidal waveform, wherein the sinusoidal waveform is in phase with the input current waveform; and a controller coupled to the first and second MOSFETs, wherein the controller controls switching of the first and second MOSFETs.

9. The bridgeless constant current power factor correction circuit of claim 8, further comprising:

an output bus coupled to the input capacitor via at least one voltage conditioning component, the output bus configured to provide an output voltage to a load, the output voltage being a conditioned form of the input voltage.

10. The bridgeless constant current power factor correction circuit of claim 9, wherein the controller monitors the input voltage and compares the input voltage to a reference voltage, and wherein the controller switches the first or second MOSFET from the OFF state to the ON state when the input voltage reaches the reference voltage.

11. The bridgeless constant current power factor correction circuit of claim 10, wherein the controller further comprises:

a feedback controller, wherein the feedback controller receives and compares the output voltage and the reference voltage, and produces an adjustment signal, wherein the adjustment signal increases when the output voltage is below the reference voltage and decreases when the output voltage is above the reference voltage, and wherein the adjustment signal is multiplied with a reference wave synchronized with the input current waveform, generating a control reference signal used to control switching of the first and second MOSFETs.

12. The bridgeless constant current power factor correction circuit of claim 11, wherein the controller further comprises:

a pulse width modulation (PWM) controller, wherein the PWM controller receives the control reference signal and generates a corresponding PWM signal, and wherein the PWM signal drives the switching of the first and second MOSFETs.

13. The bridgeless constant current power factor correction circuit of claim 8, further comprising:

a first transformer, wherein the first transformer receives the input voltage during the first half cycle of the input current and outputs an output voltage; and a second transformer, wherein the second transformer receives the input voltage during the second half cycle of the input current and outputs the output voltage.

14. The bridgeless power factor correction circuit of claim 9, wherein the reference voltage comprises an amplitude representative of a desired power level.

15. The bridgeless power factor correction circuit of claim 8, wherein the first and second MOSFETs are biased in the opposite direction, wherein the second MOSFET is shorted when the first MOSFET is operational and the first MOSFET is shorted when the second MOSFET is operational.

16. A method of power factor correction on a constant current system, comprising:

receiving an input current from a constant current input source, the input current having a current waveform;

allowing an input capacitor to charge from the input current, wherein an input voltage formed at the input capacitor rises as the input capacitor charges;

determining if the input voltage reaches a reference voltage;

when the input current is in a first half cycle, switching a first switching device from a first state to a second state when the input voltage reaches the reference voltage;

when the input current is in a second half cycle, switching a second switching device from a first state to a second state when the input voltage reaches the reference voltage;

allowing the input capacitor to drain, wherein the input voltage drops as the input capacitor drains; and shaping the input voltage to have a voltage waveform similar to the current waveform by controlling the switching of the first and second switching devices.

17. The method of power factor correction on a constant current system of claim 16, further comprising:

outputting the input voltage via an output bus.

18. The method of power factor correction on a constant current system of claim 17, further comprising:

filtering and rectifying the input voltage to produce a DC voltage; and outputting the DC voltage via a DC output bus.

19. The method of power factor correction on a constant current system of claim 16, wherein during the first half cycle of the input current, the input voltage rises when the first switching device is in the first state and the input voltage drops when the first switching device is in the second state; and wherein during the second half cycle of the input current, the input voltage rises when the second switching device is in the first state and the input voltage drops when the second switching device is in the second state.

20. The method of power factor correction on a constant current system of claim 16, wherein the first and second switching devices each comprises a MOSFET.

* * * * *